Feb. 10, 1931.  A. L. HOLLING  1,791,501

EYEGLASS SPRING RETAINER

Filed June 18, 1928

Inventor
Alfred Louis Holling
By Carlos P. Griffin
Attorney

Patented Feb. 10, 1931

1,791,501

UNITED STATES PATENT OFFICE

ALFRED LOUIS HOLLING, OF SAN FRANCISCO, CALIFORNIA

EYEGLASS-SPRING RETAINER

Application filed June 18, 1928. Serial No. 286,139.

This invention relates to an eyeglass spring retainer, and one object is to produce a hook having a transverse V shaped gripping surface on the end piece of the bridge of an eyeglass which will prevent the spring from being accidentally slipped out of place and thereby reducing the pressure on the nose piece so the eyeglass will not stay on the nose.

It will be understood by those skilled in the art that with common forms of spiral spring nose piece eyeglasses that the users are continually having trouble with them by reason of the fact that in wiping the glasses, the user often slips the end of the spring out of its place, and then the nose piece without retaining the glasses in place becomes useless, until the spring has been reset.

With the present invention the end piece of the bridge is so shaped as to provide a hook having a V shaped gripping surface under which one end of the spring is placed, and the hook will not allow the spring to escape if the apparatus has been at all well made.

Other objects of the invention will be apparent as the description proceeds.

An embodiment of the invention is shown in the accompanying drawings in which the same reference numeral is applied to the same portion throughout the several figures of the drawings of which there may be modifications.

Figure 1:
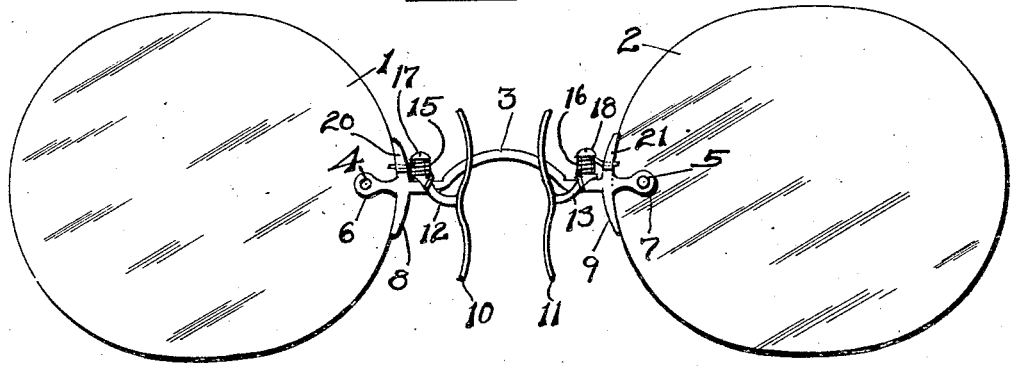
Figure 1 is a front elevation of an eyeglass with this hook applied thereto.
Figure 2:
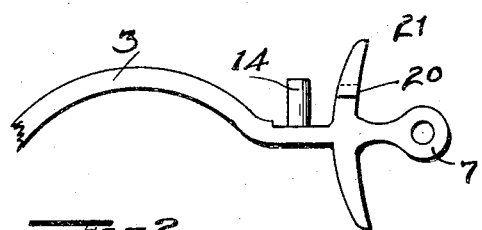
Figure 2 is an enlarged view of the hook with the spring and glass removed.
Figure 3:
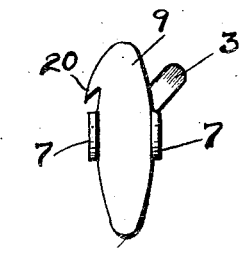
Figure 3 is an end view of the bridge end showing the hook projecting transversely of the glass, and having a V shaped gripping surface.

The numerals 1 and 2 indicate the eyeglasses which are connected together by the bridge 3, screws at 4 and 5 connecting the straps 6 and 7 to the end pieces 8 and 9. The noseguards 10 and 11 are provided with the arms 12 and 13 which are pivoted on the post 14 adjacent each end piece.

The two posts 14 are pivot points for the nose guards, and they also serve as retainers for the spiral springs 15 and 16, screws 17 and 18 in the top of the posts acting to hold the springs down on the nose.

Each end piece has a hook 20 under which the end of the nose guard spring is placed, said hook projecting transversely of the glass and having a V shaped gripping surface holding the end against accidental displacement at all times.

When the spring end is engaged under the hooks 20, 21 it is almost impossible to accidentally disengage said springs from the hook and prevent the proper operation of the nose guard. The transversely placed and downwardly shaped projection on the end piece having the post that carries the spring so close that the end thereof passes under the hook by such a short span that it is difficult for anything to catch on and dislodge it.

Having thus described my invention, what I desire to secure by Letters Patent of the United States is as follows, but modifications may be made in carrying out the invention as shown in the drawings and in the above particularly described form thereof, within the purview of the annexed claims.

1. An eye glass comprising a bridge, an end piece projecting from said bridge, a nose guard pivotally mounted on the bridge, a spiral spring having one end secured to the nose piece, and the other end of the spring bearing upon the end piece, and a hook projecting transversely on the end piece and having a V shaped gripping surface to retain the spring in its proper position.

2. An eye glass spring retainer comprising a bridge having end pieces and straps, vertical posts on said bridge adjacent the end piece, nose guards pivoted on said posts, downwardly and transversely projecting hooks having V shaped under-gripping surfaces on said end pieces, coil springs mounted on said posts, the lower end of said spring bearing on said nose guards, the upper end sprung down to engage said V shaped gripping surfaces.

In testimony whereof I have hereunto set my hand this 11th day of June, A. D. 1928.

ALFRED LOUIS HOLLING.